US009566879B2

(12) United States Patent
Schumann et al.

(10) Patent No.: US 9,566,879 B2
(45) Date of Patent: Feb. 14, 2017

(54) UNLOCKING DEVICE FOR A VEHICLE SEAT WITH AN ENTRY FACILITATION FUNCTION AND METHOD FOR OPERATING AN UNLOCKING DEVICE

(71) Applicant: JOHNSON CONTROLS COMPONENTS GMBH & CO. KG, Kaiserslautern (DE)

(72) Inventors: Kai Schumann, Rieschweiler (DE); Ingo Teufel, Rockenhausen (DE)

(73) Assignee: Johnson Controls Components GmbH & Co. KG, Kaiserslautern (DE)

( * ) Notice: Subject to any disclaimer, the term of this patent is extended or adjusted under 35 U.S.C. 154(b) by 100 days.

(21) Appl. No.: 14/369,281

(22) PCT Filed: Nov. 15, 2012

(86) PCT No.: PCT/EP2012/072751
§ 371 (c)(1),
(2) Date: Jun. 27, 2014

(87) PCT Pub. No.: WO2013/097979
PCT Pub. Date: Jul. 4, 2013

(65) Prior Publication Data

US 2014/0375095 A1 Dec. 25, 2014

(30) Foreign Application Priority Data

Dec. 28, 2011 (DE) ........................ 10 2011 090 055
Apr. 3, 2012 (DE) ........................ 10 2012 205 485

(51) Int. Cl.
*B60N 2/08* (2006.01)
*B60N 2/07* (2006.01)
(Continued)

(52) U.S. Cl.
CPC ............... *B60N 2/08* (2013.01); *B60N 2/0705* (2013.01); *B60N 2/123* (2013.01); *B60N 2/20* (2013.01); *B60N 2002/126* (2013.01)

(58) Field of Classification Search
CPC ......... B60N 2/08; B60N 2/0705; B60N 2/123; B60N 2/20; B60N 2002/126
(Continued)

(56) References Cited

U.S. PATENT DOCUMENTS 4,143,911 A 3/1979 Sakakibara et al.
4,449,752 A * 5/1984 Yasumatsu ............. B60N 2/123 297/341

(Continued)

FOREIGN PATENT DOCUMENTS

CN 1388783 A 1/2003
DE 100 57 712 A1 5/2002

(Continued)

OTHER PUBLICATIONS

Office Action dated Jun. 26, 2015, in corresponding Korean application No. 10-2014-7021181 and English translation, 14 pages.

(Continued)

*Primary Examiner* — David R Dunn
*Assistant Examiner* — Tania Abraham
(74) *Attorney, Agent, or Firm* — Foley & Lardner LLP

(57) ABSTRACT

An unlocking device for a vehicle seat with an entry facilitation function includes a bracket-like element and a guide bar. The guide bar is arranged by at least one fastening device on a lower rail of a rail system for longitudinal adjustment of the seat. The bracket-like element is coupled to a triggering lever for the entry facilitation function. A method is provided for operating an unlocking device.

11 Claims, 7 Drawing Sheets

1 7 15 4 14 2 16 10 12 5 3 9 11 8 9 6

(51) Int. Cl.
*B60N 2/12* (2006.01)
*B60N 2/20* (2006.01)

(58) Field of Classification Search
USPC .................................................... 297/344.1
See application file for complete search history.

(56) References Cited

U.S. PATENT DOCUMENTS 4,742,983 A * 5/1988 Nihei .................... B60N 2/123 248/419
4,898,356 A * 2/1990 Pipon .................... B60N 2/123 248/429
5,597,206 A * 1/1997 Ainsworth ........... B60N 2/0705 297/317
6,098,946 A * 8/2000 Sechet ................. B60N 2/0705 248/424
2005/0206204 A1 9/2005 Ogawa

FOREIGN PATENT DOCUMENTS

DE 1020040 17 491 A1 12/2004
DE 1020040 02 728 B3 4/2005
DE 1020100 55 244 A1 6/2012
EP 0 644 080 A1 3/1995
FR 2710011 A1 3/1995
FR 2853597 A1 10/2004
JP 49-003317 1/1974
JP 53-067223 S 6/1978
JP 55-091426 A 7/1980
KR 10-0759180 B1 9/2007
WO WO-2008/018688 A1 2/2008

OTHER PUBLICATIONS

International Search Report in PCT/EP2012/072751.
Office Action dated Apr. 22, 2015, in corresponding Japanese application No. 2014-549384, and English Summary of the office Action, 4 pages.
Office Action dated Dec. 4, 2012 in corresponding German Patent Application No. 10 2012 205 485.5 and English machine translation, 11 pages.
Office Action dated Oct. 10, 2015, in corresponding Chinese Application No. 201280064975.X, 7 pages.
Office Action dated Jul. 26, 2016, received in corresponding Japanese Application No. 2015-221167, (2 pages) and English machine translation (3 pages).

* cited by examiner

UNLOCKING DEVICE FOR A VEHICLE SEAT WITH AN ENTRY FACILITATION FUNCTION AND METHOD FOR OPERATING AN UNLOCKING DEVICE

CROSS REFERENCE TO RELATED APPLICATIONS

The present application is a U.S. National Stage of International Application No. PCT/EP2012/072751 filed on Nov. 15. 2012, which claims the benefit of German Patent Application No. 10 2011 090 055.1 filed on Dec. 28, 2011, and German Patent Application No. 10 2012 205 485.5 filed on Apr. 3, 2012, the entire disclosures of all of which are incorporated herein by reference.

DESCRIPTION

The invention relates to an unlocking device for a vehicle seat with an entry facilitation function as claimed in the preamble of claim 1. The invention further relates to a method for operating such an unlocking device as claimed in the preamble of claim 7.

DE 10 2004 002 728 B3 describes a vehicle seat comprising a seat frame with upper rails which are adjustable in the longitudinal direction on lower rails fixed to the vehicle and a backrest locked in position on a component fixed to the seat frame via inclination adjusters, wherein the vehicle seat is able to be adjusted from a position of use into an easy-entry position by folding the backrest forward into a partially folded-forward position and by longitudinal adjustment of the seat frame in the forward direction from a region of use into an easy-entry region. In this case, it is provided that the backrest comprises a latch for the partially folded-forward position thereof and a latching mechanism is provided on the seat frame, said latching mechanism being automatically adjustable depending on the longitudinal position of the seat frame and in the rear region of use adopting a release position and in the front easy-entry region adopting a latching position in which it is latched to the latch of the backrest and is only releasable from the latch by an adjustment of the seat frame to the rear from the easy-entry region into the region of use.

It is the object of the present invention to specify an unlocking device which is improved relative to the prior art for a vehicle seat with an entry facilitation function and an improved method for operating such an unlocking device.

With regard to the unlocking device for a vehicle seat with an entry facilitation function, the object is achieved by the features set forth in claim 1.

With regard to the method for operating an unlocking device, the object is achieved by the features set forth in claim 7.

Advantageous developments of the invention form the subject matter of the sub-claims.

According to the invention, an unlocking device for a vehicle seat with an entry facilitation function comprises a bracket-like element and a guide bar, wherein the guide bar is arranged by means of at least one fastening means on a lower rail of a rail system for longitudinal adjustment of the seat and the bracket-like element is coupled to a release lever for the entry facilitation function.

By means of an unlocking device according to the invention, it is possible to unlock the rail system independently of a backrest position. In this case, this unlocking system is advantageously integrated on or in the rail system and is dependent on a position of the upper rail relative to the lower rail.

Such an unlocking system may be implemented particularly advantageously by means of few components.

The guide bar is preferably configured as a stamped sheet metal part which has been bent back several times and shaped so as to correspond partially to the lower rail. Such a component is able to be produced in a particularly simple and cost-effective manner, in particular by mass production.

The guide bar advantageously has at least one guide portion which is bent back from a side surface of the lower rail and arranged thereon.

Particularly preferably, a first end of the guide portion is of rounded configuration. This reduces the risk of injury to a vehicle user and permits a secure engagement between the bracket-like element and guide bar which is minimal in terms of wear.

In a particularly advantageous embodiment, the bracket-like element has an at least partially U-shaped cross section, wherein a first widened portion is arranged at the end of the bracket-like element and a second widened portion is arranged in a central region of the bracket-like element. In this manner, all necessary functional elements are able to be integrated in a bracket-like element formed in one piece.

Expediently, a control module acts on the second widened portion and on an end of the bracket-like element remote from the first widened portion.

Particularly preferably, a roller element is arranged on the first widened portion of the bracket-like element configured as a pivot. This permits a movement of the bracket-like element along the guide portion of the guide bar with minimal friction.

In a particularly advantageous embodiment, the bracket-like element on the upper face has a recess, preferably of rounded or semi-rounded configuration, said recess being configured so as to correspond with a conventional release lever of a locking element of the rail system, wherein the release lever is arranged in the recess of the bracket-like element at least partially by a material connection.

In the method for operating an unlocking device, according to the invention during the operation of the entry facilitation function the rail system is unlocked by means of an actuating cable which acts on a control module which acts on a bracket-like element and at least one locking element, wherein the bracket-like element is pivoted such that a first widened portion of the bracket-like element is arranged with a roller element below a guide portion.

During an actuation of the entry facilitation function and, in particular, during a resulting movement of the vehicle seat in the longitudinal direction into a position facilitating the entry of vehicle occupants, the bracket-like element, in particular the first widened portion thereof with the roller element, at least partially forms a form-fit connection and/or a force-fit connection with a guide bar, in particular the guide portion thereof, such that the release lever of the entry facilitation function is held in an unlocked position counter to a restoring spring associated therewith, independently of a backrest inclination of a seat backrest of the vehicle seat, wherein the first widened portion of the bracket-like element with the roller element is arranged in the manner of an undercut on the lower face of the guide portion and is able to be moved along a lower face of the guide portion.

The invention is described in more detail with reference to the accompanying schematic figures, in which:

FIG. 1 shows schematically a perspective view of an unlocking device for a vehicle seat with an entry facilitation function in the locked state of the rail system, FIG. 2 shows schematically a perspective view of an unlocking device for a vehicle seat with an entry facilitation function in the unlocked state of the rail system, FIG. 3 shows schematically a perspective view of an unlocking device for a vehicle seat with an entry facilitation function in the unlocked state of the rail system in a position facilitating the entry of vehicle occupants, FIG. 4 shows schematically a front view of an unlocking device for a vehicle seat with an entry facilitation function in the unlocked state of the rail system, FIG. 5 shows schematically a perspective view of a rail system for a vehicle seat with an entry facilitation function, FIG. 6 shows schematically a perspective view of a rail of a rail system for a vehicle seat with an entry facilitation function in the locked state, FIG. 7 shows schematically a perspective view of a rail of a rail system for a vehicle seat with an entry facilitation function in the unlocked state, FIG. 8 shows schematically a perspective view of a rail of a rail system for a vehicle seat with an entry facilitation function in the unlocked state in a position facilitating the entry of vehicle occupants, FIG. 9 shows schematically a further perspective view of a rail of a rail system for a vehicle seat with an entry facilitation function in the unlocked state in a position facilitating the entry of vehicle occupants, FIG. 10 shows schematically a front view of an unlocking device for a vehicle seat with an entry facilitation function in the unlocked state of the rail system, FIG. 11 shows schematically a perspective partial sectional view of a rail of a rail system for a vehicle seat with an entry facilitation function in the unlocked state, FIG. 12 shows a perspective partial sectional view of a rail of a rail system for a vehicle seat with an entry facilitation function in the locked state and FIG. 13 shows schematically a perspective view of a bracket-like element of the unlocking device.

Parts which correspond to one another are provided in all of the figures with the same reference numerals.

FIG. 1 shows schematically a perspective view of an unlocking device 1 for a vehicle seat, not shown in more detail, with an entry facilitation function in the locked state of a rail system 2.

Such a rail system 2 is configured as a conventional rail system and comprises, as shown in FIG. 5, two individual rails 18 which are preferably arranged in the direction of travel on both sides in the vehicle and on the vehicle seat. In this case, each rail 18 comprises a lower rail 3 and an upper rail 4.

In the operating position of the rail system 2, the upper rail 4 is arranged in a longitudinally displaceable manner at least partially in the lower rail 3.

In the conventional manner, locking elements 5 are arranged on the rail system 2, said locking elements in the locked state preventing a relative movement between the lower rail 3 and the upper rail 4 and in the unlocked state permitting a relative movement between the lower rail 3 and upper rail 4 in the longitudinal direction.

The lower rail 3 is fastened in a conventional manner, not shown, by means of corresponding fastening portions to a vehicle floor of a vehicle and preferably aligned in the longitudinal direction of the vehicle.

A conventional vehicle seat is arranged on the upper rail 4, said vehicle seat comprising an entry facilitation function. Such a vehicle seat or the seat backrest thereof is able to be pivoted forward about a pivot axis in the direction of travel to facilitate the entry and exit of the rear occupants of the vehicle, wherein the vehicle seat is able to be displaced, in particular forward in the direction of travel, by means of the rail system 2 into a position facilitating the entry of vehicle occupants.

According to the invention, the unlocking device 1 is arranged on the rail system 2 or the unlocking device 1 is integrated in the rail system 2.

By means of the unlocking device 1, an unlocking of the rail system 2 is permitted independently of a backrest position and/or a backrest inclination of a seat backrest of the vehicle seat.

The unlocking device 1 for a vehicle seat with an entry facilitation function comprises at least one bracket-like element 7, shown in more detail in FIG. 13, a guide bar 8 and a control module 19.

The control module 19 is coupled by means of a correspondingly shaped coupling portion 21 to a conventional actuating cable 22 of the entry facilitation function.

The guide bar 8 is arranged by means of corresponding fastening means 9, for example rivets, on the lower rail 3 of the rail system 2 for longitudinal adjustment of the seat. The guide bar 8 is preferably configured as a stamped sheet metal part bent back several times and shaped so as to correspond partially to the lower rail 3. In this case, the guide bar 8 comprises a guide portion 10 which is bent back from a side surface 11 of the lower rail 3 and arranged thereon.

A first end 12 of the guide portion 10 is preferably of rounded configuration.

The bracket-like element 7, which is shown in more detail in FIG. 13, has an at least partially U-shaped cross section, wherein a first widened portion 14 is arranged at the end of the bracket-like element 7 and a second widened portion 15 is arranged in a central region of the bracket-like element 7.

In this case, the second widened portion 15 is configured as an actuating portion on which the control module 19 at least partially acts.

The bracket-like element 7 on the upper face has a recess 20 which is preferably of rounded or semi-rounded configuration, said recess being configured so as to correspond with a conventional release lever 13 of a locking element 5 of the rail system 2. In this case, the release lever 13 is arranged, preferably welded, by a material connection, in the recess 20 of the bracket-like element 7.

A roller element 16 is arranged on the first widened portion 14 configured as a pivot.

The bracket-like element 7 is coupled with its end 17 remote from the first widened portion 14 to the control module 19 of the entry facilitation function.

FIG. 6 shows schematically a perspective view of a rail 18 of the rail system 2 for a vehicle seat with an entry facilitation function in the locked state, in which the release lever 13 is unactuated. In this case, the first widened portion 14 is arranged with the roller element 16 above the guide portion 10.

FIG. 12 shows schematically a perspective partial sectional view of a rail 18 of the rail system 2 for a vehicle seat with an entry facilitation function in the locked state of the locking element 5.

Figure 1:
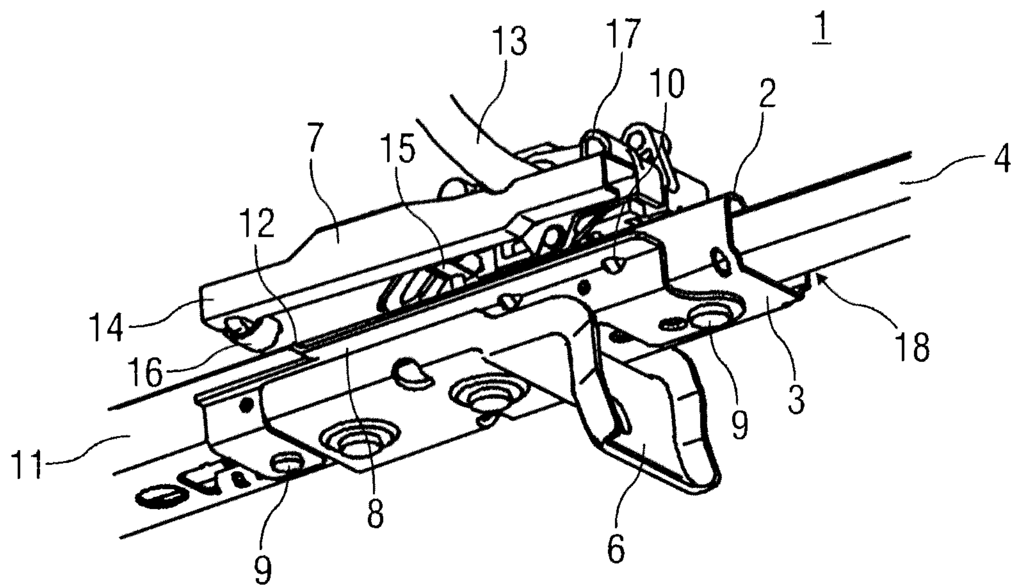
Figure 2:
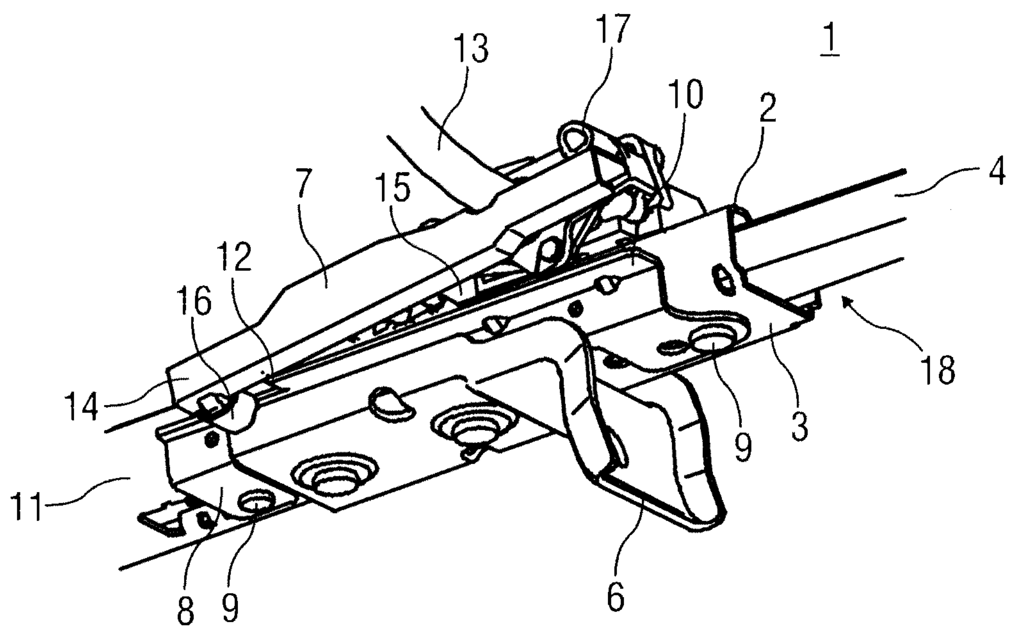
FIG. 2 shows schematically a perspective view of the unlocking device 1 for a vehicle seat with an entry facilitation function in the unlocked state of the rail system 2.

During operation of the entry facilitation function, the seat backrest is pivoted forward, wherein the actuating cable 22 actuates the control module 19. This actuation takes place by the control module 19 acting on the bracket-like element 7 and actuating a pivoting movement thereon by which the release lever 13 which is coupled fixedly in terms of rotation to the bracket-like element 7 performs a pivoting movement.

By means of this pivoting movement, the rail system 2 is unlocked by means of the release lever 13 which acts on at least one locking element 5. In this case, the bracket-like element 7 is pivoted with the release lever 13 such that the first widened portion 14 is arranged with the roller element 16 below the guide portion 10.

Figure 11:
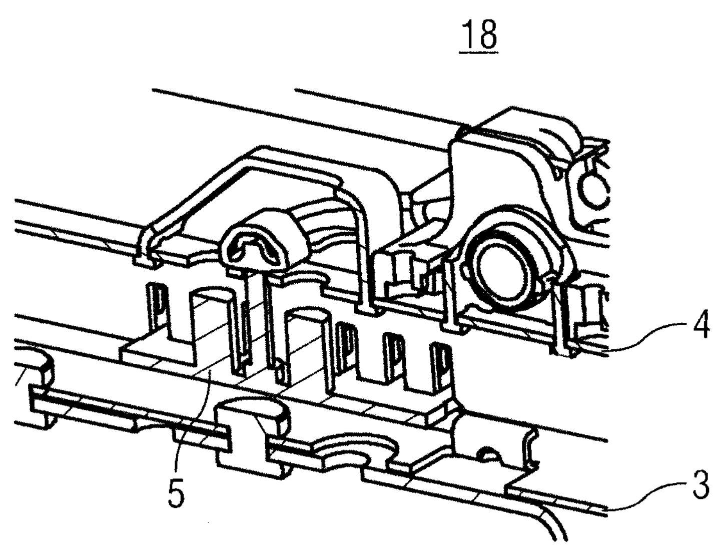
Figure 12:
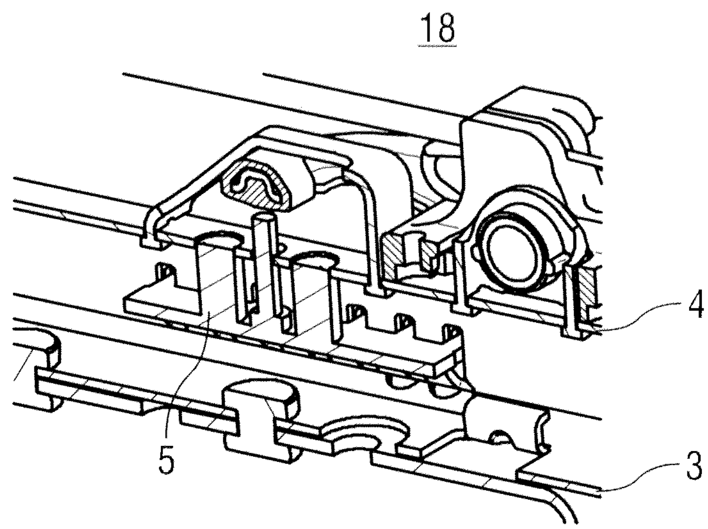
Figure 13:
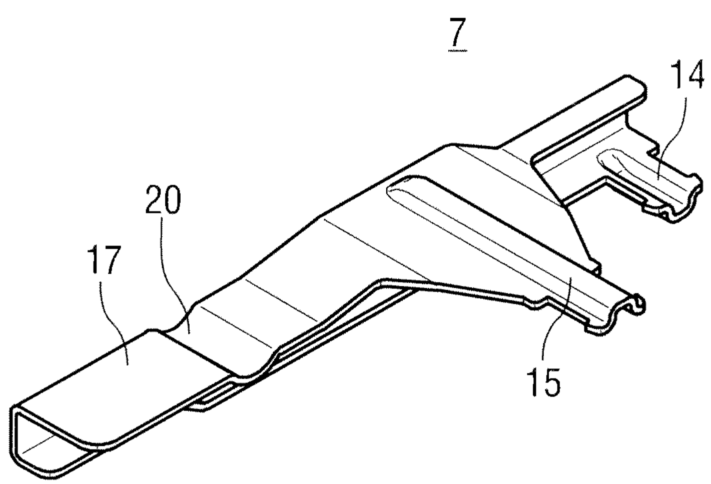

Moreover, the locking element 5, for example a conventional latching plate, is actuated such that the rail system 2 as shown in FIG. 11, is in an unlocked state.

Figure 3:
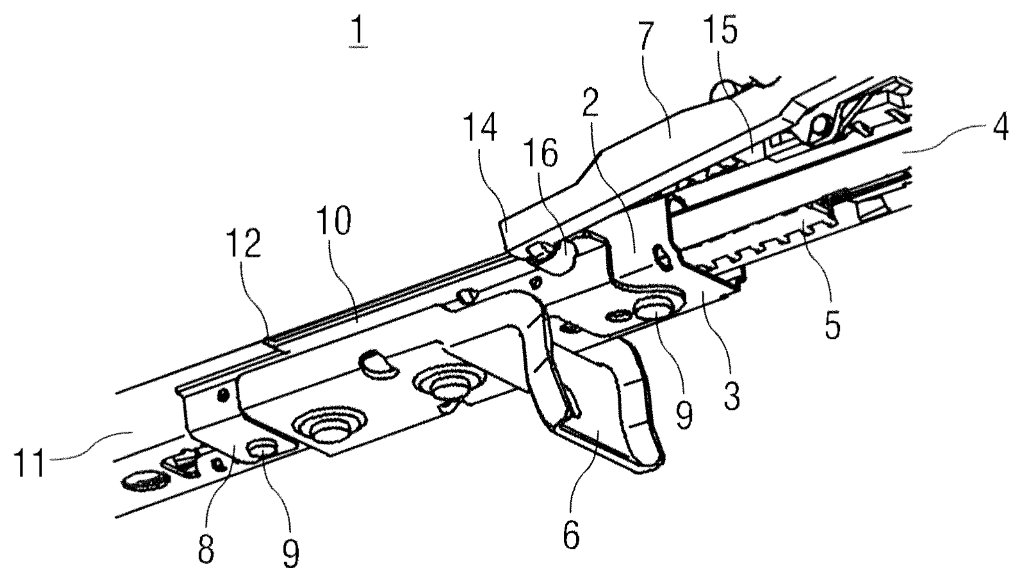

FIG. 3 shows schematically a perspective view of the unlocking device 1 for a vehicle seat with an entry facilitation function in the unlocked state of the rail system 2 in a forward displaced position facilitating the entry of vehicle occupants.

Figure 8:
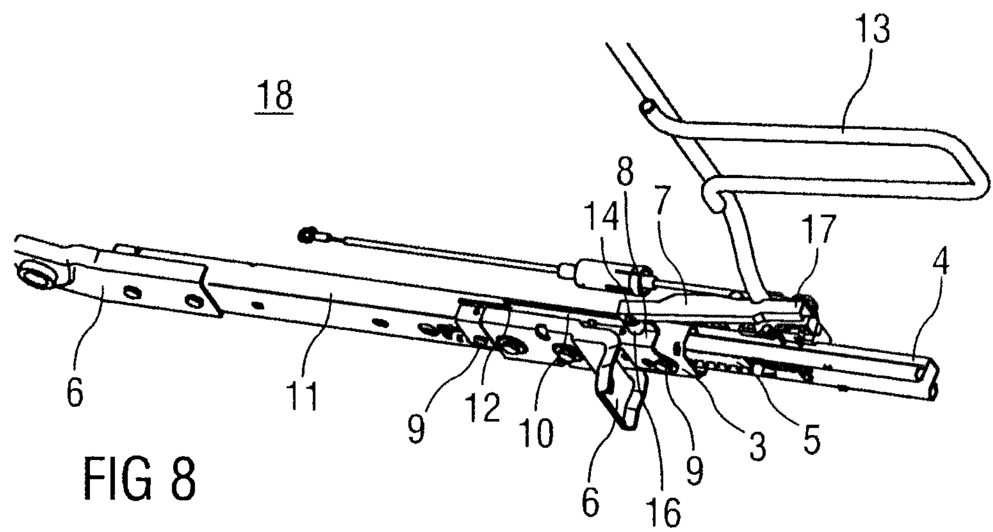

FIG. 8 shows schematically a perspective view of a rail 18 of a rail system 2 for a vehicle seat with an entry facilitation function in the unlocked state, in a forward displaced position facilitating the entry of vehicle occupants.

Figure 9:
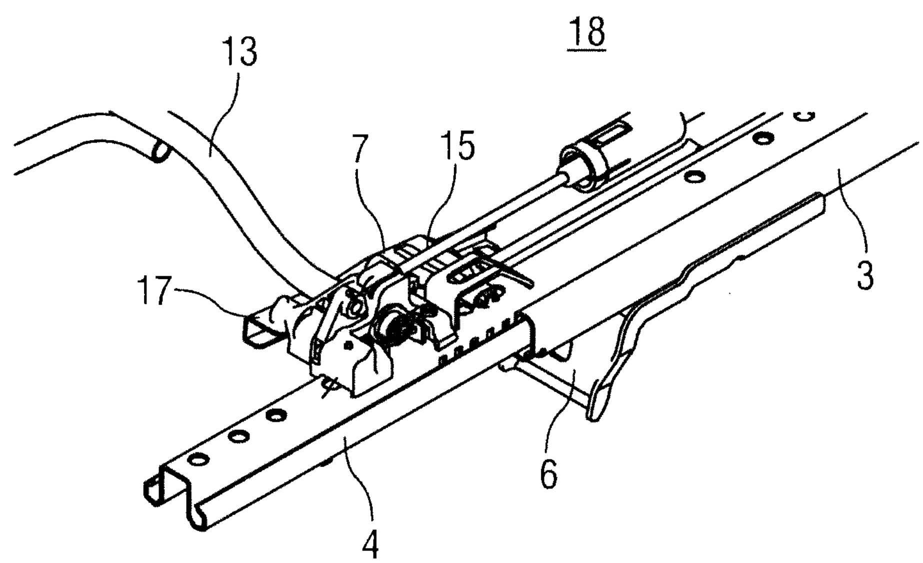

FIG. 9 shows schematically a perspective view of a rail 18 of a rail system 2 for a vehicle seat with an entry facilitation function in the unlocked state, in a forward-displaced position facilitating the entry of vehicle occupants, from a different perspective.

During actuation of the entry facilitation function and, in particular, during a resulting movement of the vehicle seat in the longitudinal direction into a position facilitating entry of the vehicle occupants, the bracket-like element 7, in particular the first widened portion 14 thereof with the roller element 16, forms at least partially a form-fit connection and/or a force-fit connection with the guide bar 8, in particular the guide portion 10 thereof, such that the release lever 13 of the entry facilitation function is held in an unlocked position counter to a restoring spring, not shown, associated therewith. In this case, the first widened portion 14 with the roller element 16 is preferably arranged in the manner of an undercut on the lower face of the guide portion 10.

Whilst the first widened portion 14 is arranged with the roller element 16 in the manner of an undercut on the lower face of the guide portion 10, the rail system is held in the unlocked state independently of a backrest inclination of the seat backrest of the vehicle seat.

In this case, the first widened portion 14 is able to be moved with the roller element 16 along a lower face of the guide portion 10. Moreover, the force -fit connection and/or a form-fit connection between the first widened portion 14 with the roller element 16 and the guide portion 10 prevents a pivoting-back of the bracket-like element 7 and the release lever 13 and a resulting locking of the rail system 2.

In this case, this unlocking system is dependent on a position of the upper rail 4 relative to the lower rail 3.

Figure 4:
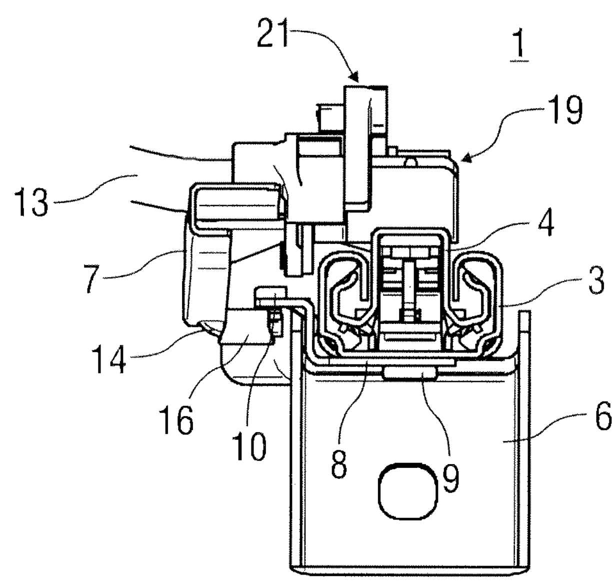
Figure 5:
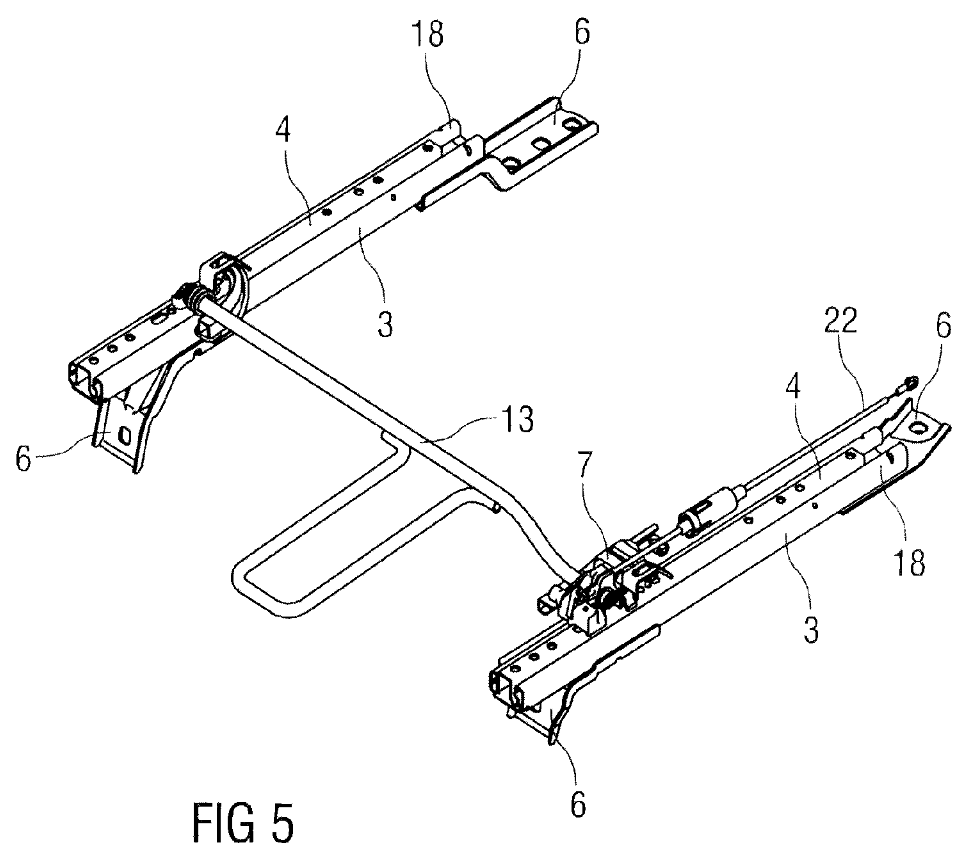
Figure 6:
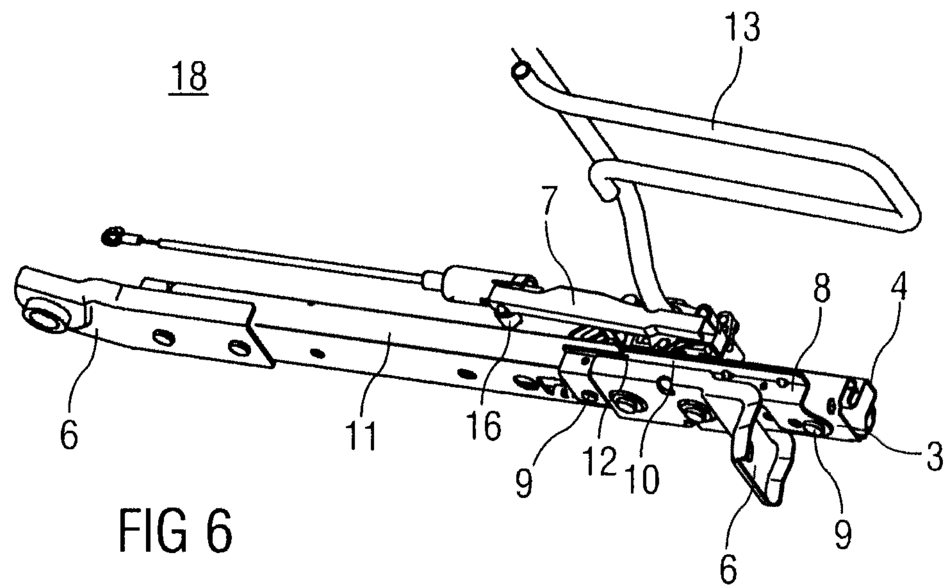
Figure 7:
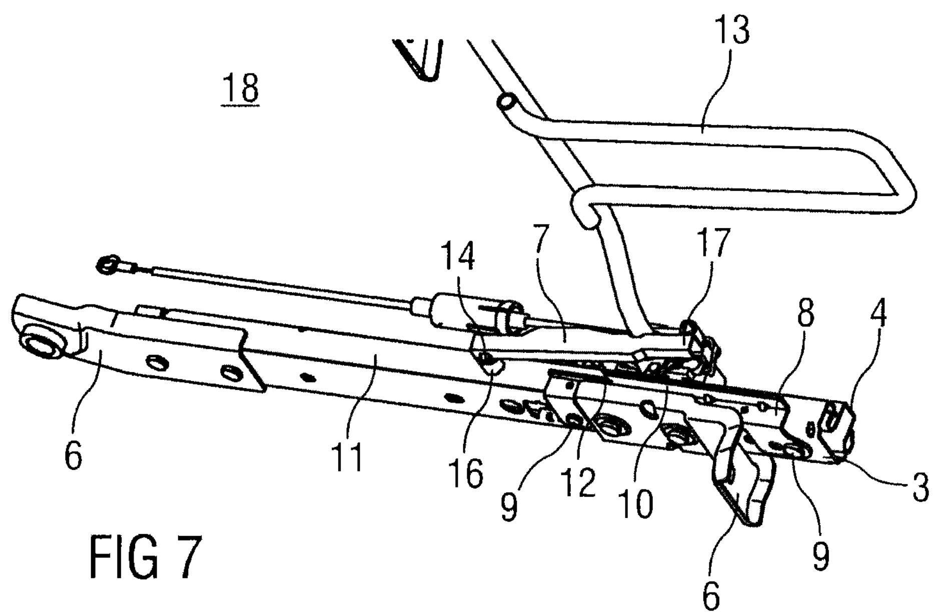
FIG. 7 shows schematically a perspective view of a rail 18 of the rail system 2 for a vehicle seat with an entry facilitation function in the unlocked state.

FIG. 4 shows schematically a front view of the unlocking device 1 for a vehicle seat with an entry facilitation function in the unlocked state of the rail system 2.

Figure 10:
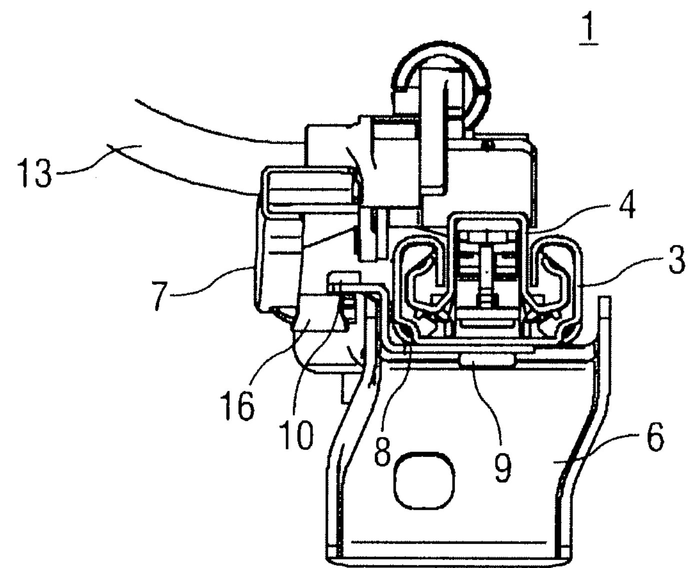

FIG. 10 shows schematically a further front view of the unlocking device 1 for a vehicle seat with an entry facilitation function in the unlocked state of the rail system 2.

LIST OF REFERENCE NUMERALS

1 Unlocking device
2 Rail system
3 Lower rail
4 Upper rail
5 Locking element
6 Fastening portion
7 Bracket-like element
8 Guide bar
9 Fastening means
10 Guide portion
11 Side surface
12 First end
13 Release lever
14 First widened portion
15 Second widened portion
16 Roller element
17 End
18 Rail
19 Control module
20 Recess
21 Coupling portion
22 Actuating cable

The invention claimed is:

1. An unlocking device for a vehicle seat with an entry facilitation function, comprising:

a bracket element; and a guide bar, wherein the guide bar is arranged by at least one fastening device on a lower rail of a rail system for longitudinal adjustment of the seat and the bracket element is securely coupled to a release lever for the entry facilitation function, wherein the bracket element is configured to engage with an underside of the guide bar in at least partially one of a form-fit connection or a force-fit connection, such that the release lever is held in an unlocked position counter to a restoring spring associated therewith.

2. The unlocking device as claimed in claim 1, wherein the guide bar is configured as a stamped sheet metal part which has been bent back at least two times and shaped so as to correspond partially with the lower rail.

3. The unlocking device as claimed in claim 1, wherein the guide bar has at least one guide portion which is bent back from a side surface of the lower rail and arranged thereon.

4. The unlocking device as claimed in claim 3, wherein a first end of the guide portion is of rounded configuration.

5. The unlocking device as claimed in claim 1, wherein the bracket element has an at least partially U-shaped cross section, wherein a first widened portion is arranged at a first end of the bracket element and a second widened portion is arranged in a central region of the bracket element.

6. The unlocking device as claimed in claim 5, wherein a control module acts on the second widened portion and on a second end of the bracket element remote from the first widened portion.

7. The unlocking device as claimed in claim 5, wherein a roller element is arranged on the first widened portion of the bracket element configured as a pivot.

8. The unlocking device as claimed in claim 1, wherein an upper face of the bracket element has a recess, said recess being configured so as to correspond to a release lever of a locking element of the rail system, wherein the release lever is arranged in the recess of the bracket element at least partially by a material connection.

9. A method for operating an unlocking device for a vehicle seat, wherein the unlocking device comprising a bracket element and a guide bar, wherein the guide bar is arranged by at least one fastening device on a lower rail of a rail system for longitudinal adjustment of the seat and the bracket element is securely coupled to a release lever for the entry facilitation function, the method comprising:

unlocking the rail system with an actuating cable which acts on a control module, wherein the control module acts on the bracket element and at least one locking element during the operation of the entry facilitation function; and pivoting the bracket element such that a roller element on a first widened portion of the bracket element is below a guide portion of the guide bar; and engaging the bracket element with an underside of the guide bar in at least partially one of a form-fit connection or a force-fit connection during actuation of the entry facilitation function, such that the release lever is held in an unlocked position counter to a restoring spring associated therewith.

10. The method as claimed in claim 9, wherein the underside of the guide bar is on the guide portion of the guide bar, wherein the roller element of the first widened portion of the bracket element engages with the underside of the guide portion, wherein the release lever is held in the unlocked position independent of a backrest inclination of a seat backrest of the vehicle seat, wherein the first widened portion of the bracket element with the roller element is able to be moved along the underside of the guide portion.

11. An unlocking device for a vehicle seat with an entry facilitation function, comprising:

a bracket element; and a guide bar, wherein the guide bar is arranged by at least one fastening device on a lower rail of a rail system for longitudinal adjustment of the seat and the bracket element is coupled to a release lever for the entry facilitation function, wherein an upper face of the bracket element has a recess, said recess being configured so as to correspond to a release lever of a locking element of the rail system, wherein the release lever is arranged in the recess of the bracket element at least partially by a material connection.

* * * * *